(12) United States Patent
Kamdem

(10) Patent No.: US 7,985,150 B2
(45) Date of Patent: Jul. 26, 2011

(54) PULLEY FOR A POWER TRANSMISSION MEMBER, A SEPARATE STARTER-ALTERNATOR FITTED WITH SUCH A PULLEY, AND AN ENGINE DRIVE SYSTEM

(75) Inventor: Henri Kamdem, Amboise (FR)

(73) Assignee: Hutchinson, Paris (FR)

( * ) Notice: Subject to any disclaimer, the term of this patent is extended or adjusted under 35 U.S.C. 154(b) by 714 days.

(21) Appl. No.: 11/281,486

(22) Filed: Nov. 18, 2005

(65) Prior Publication Data
US 2006/0122014 A1 Jun. 8, 2006

(30) Foreign Application Priority Data
Nov. 24, 2004 (FR) ..................................... 04 12479

(51) Int. Cl.
  *F16D 3/04* (2006.01)
  *F16H 55/32* (2006.01)
(52) U.S. Cl. .......... 474/94; 474/166; 474/902; 74/574.4
(58) Field of Classification Search .................. 474/166, 474/170, 70, 93, 30, 902, 9, 304; 464/75; 74/574.4, 573 R
See application file for complete search history.

(56) References Cited

U.S. PATENT DOCUMENTS

| 4,307,584 | A |   | 12/1981 | Sandiumenge |          |
|-----------|---|---|---------|-------------|----------|
| 4,328,879 | A | * | 5/1982  | Tone        | 180/219  |
| 4,486,183 | A | * | 12/1984 | Posiviata et al. | 474/94 |
| 4,794,998 | A | * | 1/1989  | Iwai et al. | 180/219  |
| 5,352,157 | A | * | 10/1994 | Ochs et al. | 464/89   |
| 5,676,225 | A |   | 10/1997 | Miyata      |          |
| 5,788,576 | A |   | 8/1998  | Varin       |          |
| 5,899,811 | A | * | 5/1999  | Kishibuchi et al. | 464/30 |
| 6,083,130 | A |   | 7/2000  | Mevissen et al. |       |
| 6,093,991 | A |   | 7/2000  | Tanaka      |          |
| 6,237,736 | B1|   | 5/2001  | Ouchi       |          |
| 6,955,252 | B2| * | 10/2005 | Allport     | 192/44   |
| 7,025,680 | B2| * | 4/2006  | Tabuchi et al. | 464/32 |
| 2002/0165053 | A1 | * | 11/2002 | Kimura et al. | 474/70 |
| 2004/0198499 | A1 | * | 10/2004 | Kamdem et al. | 464/75 |

FOREIGN PATENT DOCUMENTS

| DE | 43 09 745 | 9/1994 |
| EP | 0 012 669 | 6/1980 |
| EP | 0 517 184 | 6/1992 |
| EP | 1 378 677 | 1/2004 |

* cited by examiner

Primary Examiner — Robert Siconolfi
Assistant Examiner — Anna Momper
(74) Attorney, Agent, or Firm — Clark & Brody

(57) ABSTRACT

The invention seeks to provide a transmission system, in particular for a starter-alternator, capable both of damping large variations in torque under starting conditions (drive from the alternator) and of providing effective decoupling under running conditions (alternator driven). In an embodiment, the decoupling located between a central hub and a rim over which a drive belt (not shown) is tensioned, is provided by at least one decoupler element designed to provide optimized stiffness. In addition, the decoupler assembly is associated with at least one deflection limiter having two components: a central plate secured to an outside face of the central hub and coupled to abutments that are regularly distributed around the periphery of an inside face of the rim, the abutments and the plate being shaped so as to come into deforming contact. The resilient assembly provides two stiffness values, whether in the drive direction or in the driven direction. The invention is applicable to starter-alternators, crankshafts, and other power transmission members (compressors, etc.).

19 Claims, 16 Drawing Sheets

FIG. 5a
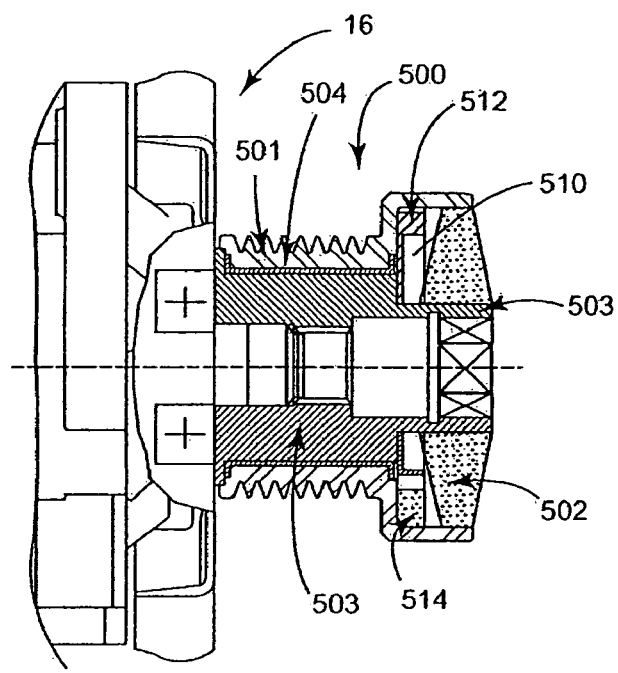
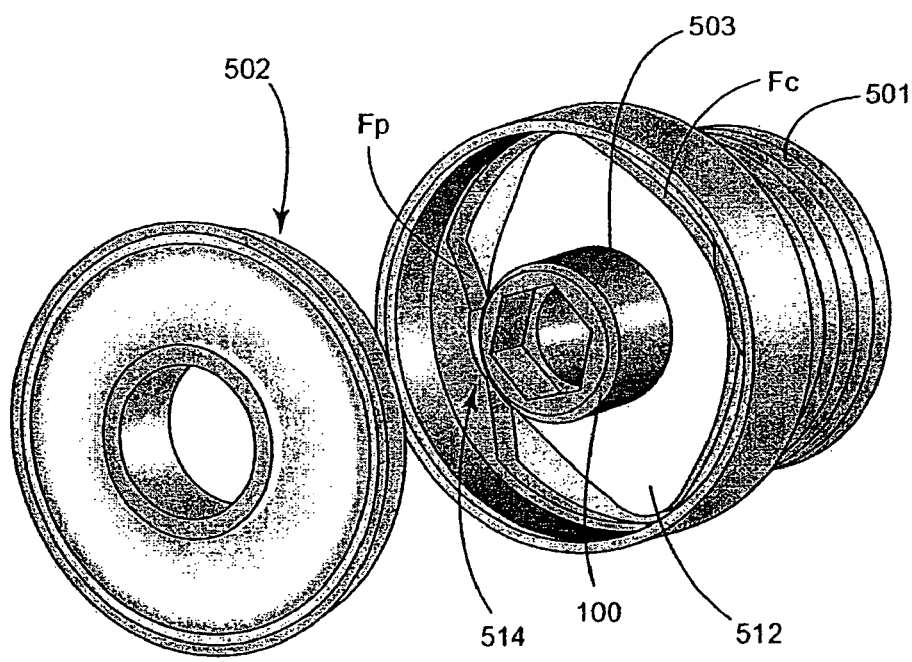
FIG. 5b

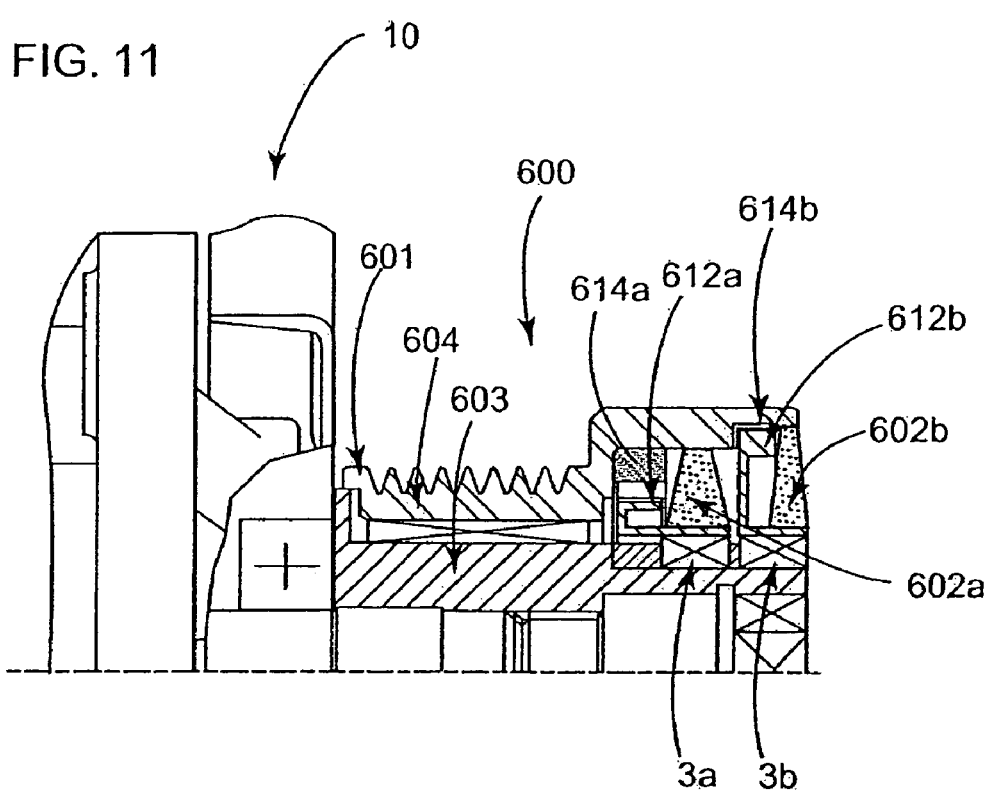

FIG. 14
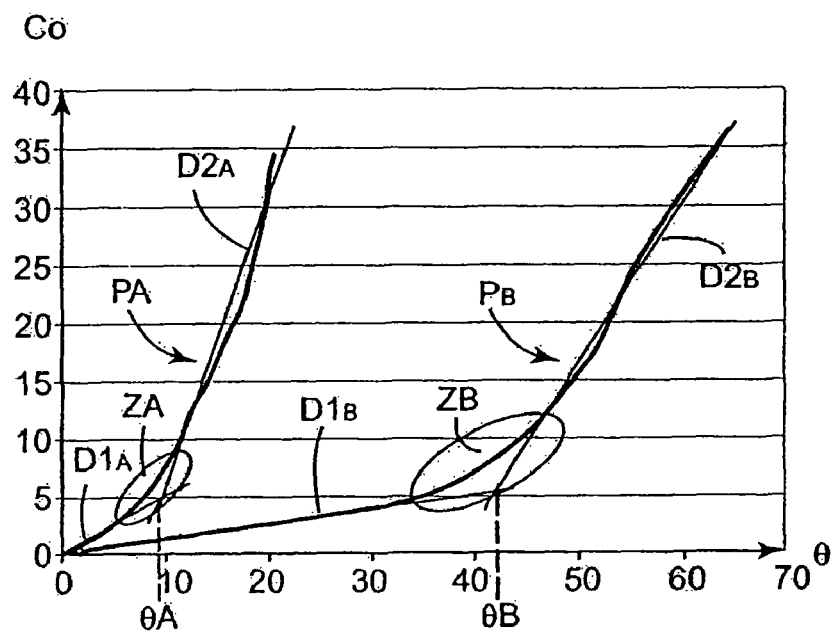
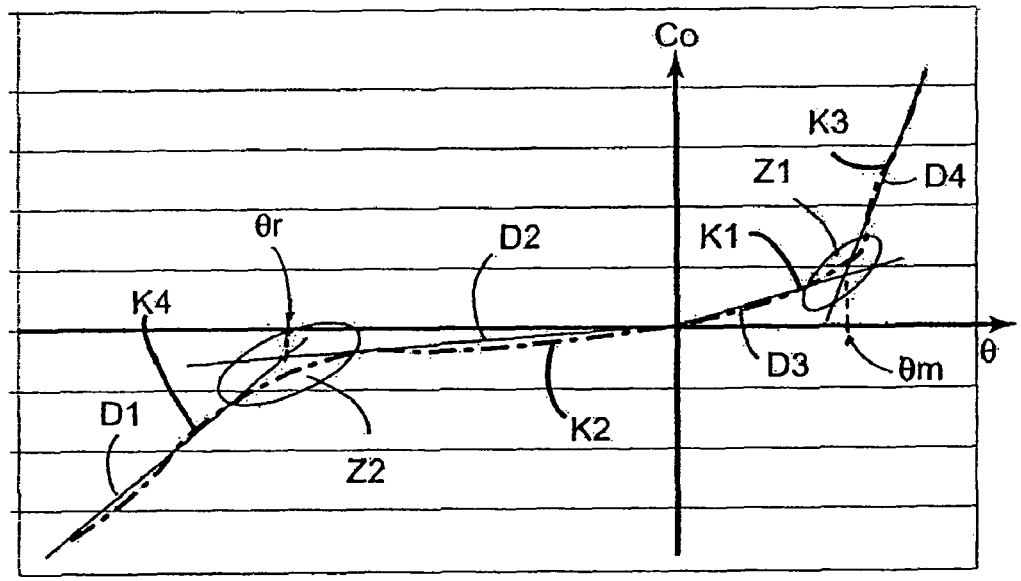
FIG. 15

PULLEY FOR A POWER TRANSMISSION MEMBER, A SEPARATE STARTER-ALTERNATOR FITTED WITH SUCH A PULLEY, AND AN ENGINE DRIVE SYSTEM

The invention relates to a pulley for a power transmission member, and particularly but not exclusively for a member that is reversible, i.e. a member capable of driving and of being driven, the invention also relates to a starter-alternator that is separate from the crankshaft of an engine and that is fitted to such a pulley, and the invention also relates to a motor vehicle engine drive system that includes in particular an alternator and a crankshaft both fitted with transmission pulleys interconnected by a belt.

BACKGROUND OF THE INVENTION

The field in question is that of power transmission and it relates more particularly, but not exclusively, to reversible drive systems for motor vehicle engines, in particular between a crankshaft and a starter-alternator that are interconnected by a belt. Such a pulley may advantageously also be fitted to other members of the drive system, in particular members that are not reversible: a compressor, a water pump, etc.

The invention may also be applied in any field that requires power to be transmitted by rotary machines or motors, e.g. in industrial installations.

It is known to integrate the starter function for an internal combustion engine with an alternator, then referred to as a starter-alternator. Such integration makes it possible to omit the starter, i.e. a heavy toothed ring coupled to a high-inertia flywheel and to the electrical starter motor.

The starter-alternator acts both as a motor for starting the engine via a flexible link and the crankshaft pulley which then acts as a brake, and also as an alternator that is driven once the engine has started and that serves in particular to recharge the battery.

Integration can be achieved either by directly coupling the alternator which is mounted on the crankshaft, referred to as an integrated starter-alternator (ISA), or else by coupling a starter-alternator via a belt transmission (as a replacement for a conventional alternator), referred to as a separate starter-alternator (SSA).

The separate configuration that uses the belt to transfer drive between the two members, i.e. the crankshaft and the alternator, enables assembly to be highly adaptable and starting to be very smooth. The belt is of the poly-V type, cog type, or trapezoidal type. The present invention relates to this separate configuration.

Unfortunately, starting an engine involves dynamic phenomena that are violent and that fluctuate rapidly as a function of internal friction varying depending on the positions of the connecting rods and on successive cylinders being put into compression. As shown by the timing diagrams of accompanying FIG. 16, during this high stress starting stage, the crankshaft speed $V_B$ increases suddenly (at an instant $t_0$ at a few seconds) and the crankshaft torque changes from being driven to driving. Under such conditions, the starter-alternator torque $C_{AD}$ likewise fluctuates, respectively from driving (positive peaks $C_m$) to being driven (negative peaks $C_r$).

After starting, once running, the crankshaft drives and the starter-alternator is driven. In operation, the instantaneous speed of the crankshaft then fluctuates in substantially sinusoidal manner: this phenomenon is referred to as engine "acyclism". These fluctuations in speed are transmitted by the belt to driven members such as the alternator, compressor, water pump, etc.

Since inertia in the starter-alternator is high, the dynamic torque generated thereby is of large amplitude, and alternates between being positive and negative in spite of rotation taking place in one direction only: this torque leads to large variations in tension, with high tension levels stressing the components (belts, tensioners, winders), and with low tensions leading to poor drive (slip) and to noise.

At engine starting speeds, the driving torque that needs to be applied to the crankshaft can reach values of about 90 newton meters (N.m), and even values that are considerably greater, being as great as 150 N.m to 180 N.m. Unfortunately, a conventional decoupling pulley mounted on an alternator is not capable of delivering driving torque greater than a value that is typically about 30 N.m at most, which means that the crankshaft can be driven with torque of 90 N.m using a typical reduction ratio of 3 between the two members.

In particular, when torque needs to be delivered to the crankshaft at significantly higher values, torque variations are large and the resulting jolts cause slip and vibration in the transmission via the belt.

It should also be observed that the positive and negative torque values are not necessarily symmetrical, given asymmetries in the damping effects (due to friction) and mechanical dissymmetries in the movements, both while starting and while running.

In order to absorb dynamic variations in started mode, it is known to make use of freewheels as described in U.S. Pat. Nos. 5,676,225, 6,093,991, or 6,237,736, or to use resilient freewheels as described in U.S. Pat. No. 6,083,130 or in European patent No. 0 517 184. In principle, freewheel or resilient freewheel systems are completely incompatible with reversible use, e.g. on a pulley of a starter-alternator for driving a crankshaft, because of the change of direction in the torque.

There also exist decoupler pulleys fitted with an elastomer ring of stiffness that determines an angular deformation. They enable irregularities in speed or torque to be absorbed and they are therefore essentially dedicated to filtering at operating speeds when crankshafts are turning slowly.

OBJECTS AND SUMMARY OF THE INVENTION

The invention seeks to solve the above-mentioned problems and in particular to provide a system that is capable, while starting, of filtering the torque jolts and of limiting variations in tension, and also limiting the risk of generating tension that is too low giving rise to slip and to noise, while also providing effective decoupling while running.

To do this, the invention makes use in particular of the resilience of decouplers for satisfying these two objects.

More precisely, the invention provides a pulley for a member for transmitting power by means of a belt at a starting speed and then at a started speed, the pulley including at least one resilient decoupling element located between a central hub and a rim over which the drive belt is tensioned, and in which the resilient element is associated with a progressive deflection limiter element to form a resilient decoupling assembly that provides stiffnesses that are adapted to filtering and damping transmission both while starting and while running.

Typically, the range of stiffnesses of such a decoupling assembly extends over 0.2 newton meters per degree (N.m/°) to 4 N.m/°.

In particular embodiments, the decoupler element is an elastomer ring bonded directly or via an insert, a torsion spring or a helical spring, or at least one of said elements associated with two freewheels mounted in opposition.

The resilient ring is made of a rubber type material, and preferably: silicone, a hydrogenated nitryl butadiene rubber (HNBR), chloroprene, an etheylene propylene diene monomer (EPDM), a butadiene rubber (BR), a nitrile rubber (NR), or a combination of at least two of these compounds. The decoupler element may also be a torsion spring having a steel blade or a helical steel spring. This diversity of materials makes it possible to adapt stiffness to any transmission system.

The resilient assembly provides two stiffness values, whether in drive phase or in driven phase, i.e. regardless of whether the member is generating or receiving driving torque, a basic first value provided by the active resilient decoupler elements, which first value is associated, above a preadjusted deflection angle, with additional stiffness provided by at least one deflection limiter having two components: a central plate secured to an outside face of the central hub and coupled to resilient abutments that are regularly disposed at the periphery on an inside face of the rim, the abutments and the plate being shaped to come into deforming contact.

In particular embodiments:

the central plate is in the form of a regular polygon, preferably having four sides, and the angular abutments are prismatic, being made of elastic material and each presenting two main contact faces and a face for bonding to the rim;

the central plate is annular and presents a peripheral layer of elastic material presenting projections that come into contact with the peripheral abutments; and the abutments are made using a peripheral spring blade integrated with the rim and presenting inwardly-directed projections that are regularly spaced apart, or it is the abutments that are spring blades.

In other particular embodiments, the invention enables stiffnesses to be used that are adapted to the system by using a suitable combination of two specific stiffnesses for each torque direction, obtained by associating:

a basic specific resilient element in a central range of positive and negative deformations respectively for each torque direction, while starting or while running, and over ranges situated beyond the central range while starting; and a specific deflection limiter in each of said positive and negative deformation ranges, for each torque direction respectively, specific to starting.

In general, the system does not respond identically, depending on the driving or driven direction of the applied torque, so the parts and the way they are arranged do not necessarily present dynamic symmetry, in particular in terms of the amounts material deformation and in the transmission of torque. The invention thus enables this dissymmetry of behavior to be accommodated by the variation in stiffness that is implemented.

Dissymmetrical embodiments of limiters adapted to such differences of behavior are similar to the preceding limiters with angle abutments and/or projections from an angular plate, but presenting differences in density, modulus, or shape associated with different contact faces so that the deforming contact obtained is of stiffness that is appropriate for the corresponding torque direction.

In addition, an optimized distribution of stiffness states corresponding to starting and to running once started in each torque direction is implemented in order to achieve amounts of angular deformation that are adapted to the system. This distribution is defined by adjusting the positions in the free state of the projections from the plate that co-operate with the contact abutments corresponding to the drive or the driven direction of the projections, to form a preadjusted angle for the threshold for changing between starting and running conditions.

In preferred embodiments:

each abutment is constituted by two half-abutments of materials having different shapes or different moduluses;

each abutment possesses a segment of rigid material or of material having a higher density than the elastic material of the remainder of the abutment, the segment being disposed closer to one of the contact faces than to the other; and a tongue of elastic material is inserted between the rim and a portion of an abutment in the form of a projection from an annular spring blade.

In order to adapt the stiffness states to the system to which they apply, it is advantageous also to have different stiffnesses in the basic range of deformations that vary as a function of the drive and driven torque directions. To do this:

for a pulley possessing two basic resilient elements of different stiffnesses, at least one of these elements is associated with a deflecting limiter of dissymmetrical type adapted in stiffness depending on direction, and each assembly is mounted on a freewheel, the two freewheels being in opposition so as to define a stiffness value that is adapted to each direction of rotation;

rollers placed in gaps that form, in the free state, between the central plate and rigid abutments, in at least two radial sets, preferably integrated in one or two levels, and of material that is adapted in terms of elasticity, friction coefficient, modulus of elasticity, and/or in determined number serve to define stiffness that is adapted to each drive or driven speed in each direction of operation.

In particular applications, at least one above-described deflection limiter may be designed to present stiffness that is sufficient on its own, i.e. without a decoupling element or without a declutched decoupling element, to provide effective damping while starting and sufficient decoupling while running.

The above solutions are particularly adapted to applications on members that are reversible or that are non-reversible, with the crankshaft being driven with torque that may reach values that are considerably greater, e.g. in the range 90 N.m to 150 N.m or even 180 N.m, thus requiring higher stiffness values to be used.

In applications relating to reversible type members in which the drive member needs to deliver a limited amount of torque to the driven member, e.g. torque limited to about 90 N.m, the specified stiffness for providing effective decoupling while running while also allowing sufficient drive torque to be provided with damping while starting can be provided by a resilient assembly comprising at least one above-described resilient decoupling element that is not associated with a deflection limiter or that is associated with a limiter that is declutched.

Such a torque value of 30 N.m in association with a conventional reduction ratio of 2.5 to 3 between the pulley diameters of the crankshaft and of the alternator, does indeed correspond to a crankshaft starting torque that can be as great as 90 N.m with stiffness up to about 2 N.m/°.

The reversible member may, in particular, be the alternator and the crankshaft: when the alternator pulley is in drive mode, the crankshaft pulley is in driven mode, and vice versa.

In a particular embodiment, the resilient assembly includes a resilient element mounted on a first freewheel associated with a second freewheel mounted between the rim and the hub, in opposition to the first freewheel.

BRIEF DESCRIPTION OF THE DRAWINGS

The invention is described in detail below in non-limiting manner by describing embodiments with reference to the accompanying figures, in which:

FIGS. 5a and 5b are an exploded view and a longitudinal section view of a pulley having a basic resilient element in the form of a ring combined with a deflection limiter having resilient abutments for providing additional stiffness in starting mode;

FIG. 11 is a longitudinal section view of an example of a pulley of the invention having two resilient rings associated with two limiters and mounted on two opposing freewheels;

FIG. 14 is a diagram showing measurements of torque as a function of angular deformation for two pulleys presenting differing structures inducing stiffness values and ranges of angular deformation that differ under starting conditions and under running conditions;

FIG. 15 is a diagram showing measurements of torque as a function of angular deformation presenting progressive transition zones between starting and running conditions.

MORE DETAILED DESCRIPTION

Figure 1:
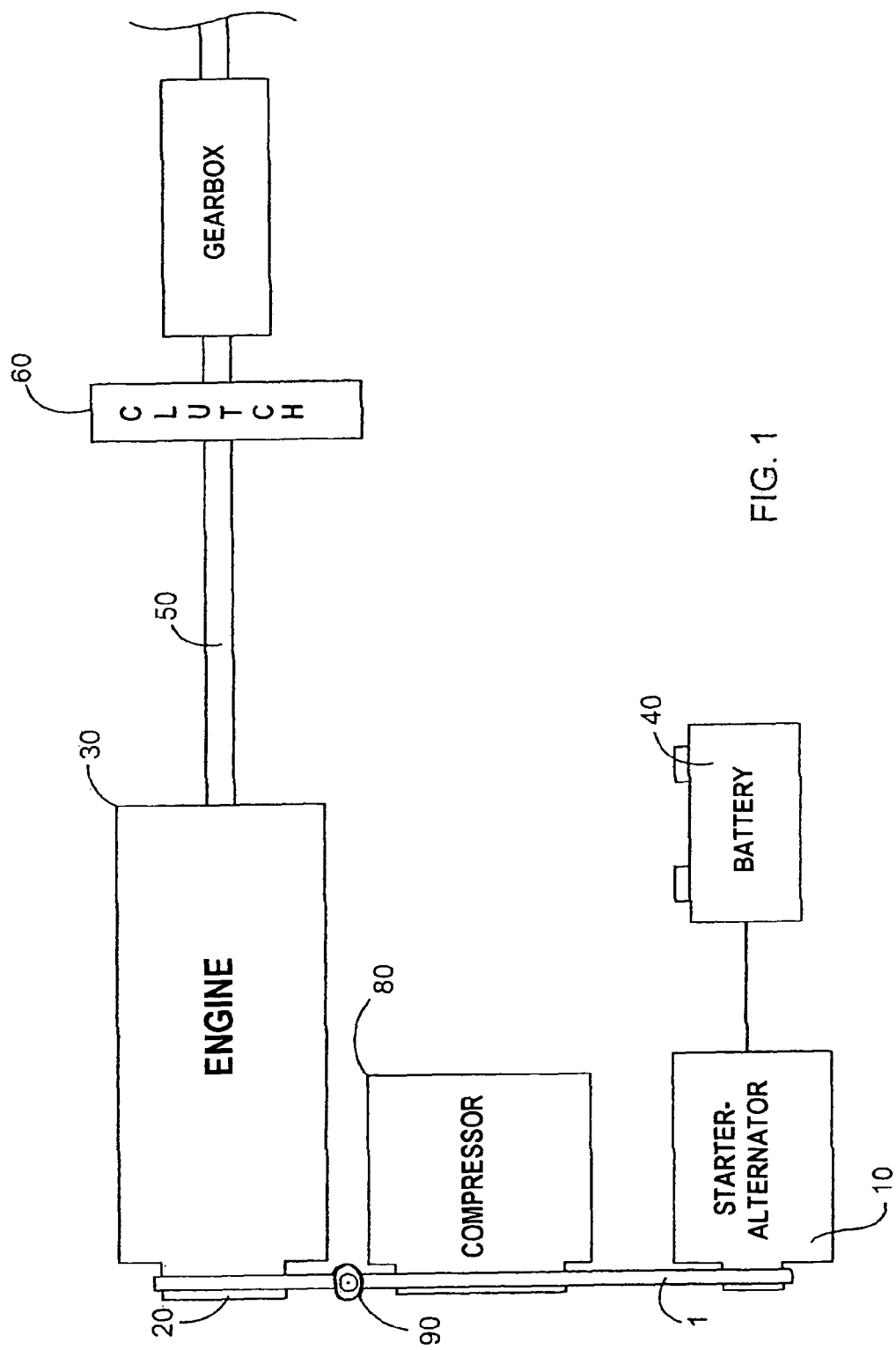
FIG. 1 is a general plan view of the positioning of a separate starter-alternator in the power unit of an automotive vehicle having an internal combustion engine.

As shown diagrammatically in FIG. 1, a separate starter-alternator 10 is located in the power unit for driving the wheels of a motor vehicle by being coupled to the crankshaft 20 of the engine 30 via a drive belt 1. The alternator 10 is also electrically connected to the battery 40. The engine 30 drives the driving wheels via a transmission shaft 50 whose driving torque is controlled by a clutch 60, with the clutch being coupled to a gearbox 70.

The belt also generally drives an air conditioning compressor 80 when it is engaged. A tensioner 90 serves to keep the belt 1 under tension. The pulley of the invention is used on the alternator and on the crankshaft, and advantageously on the compressor.

Figure 2:
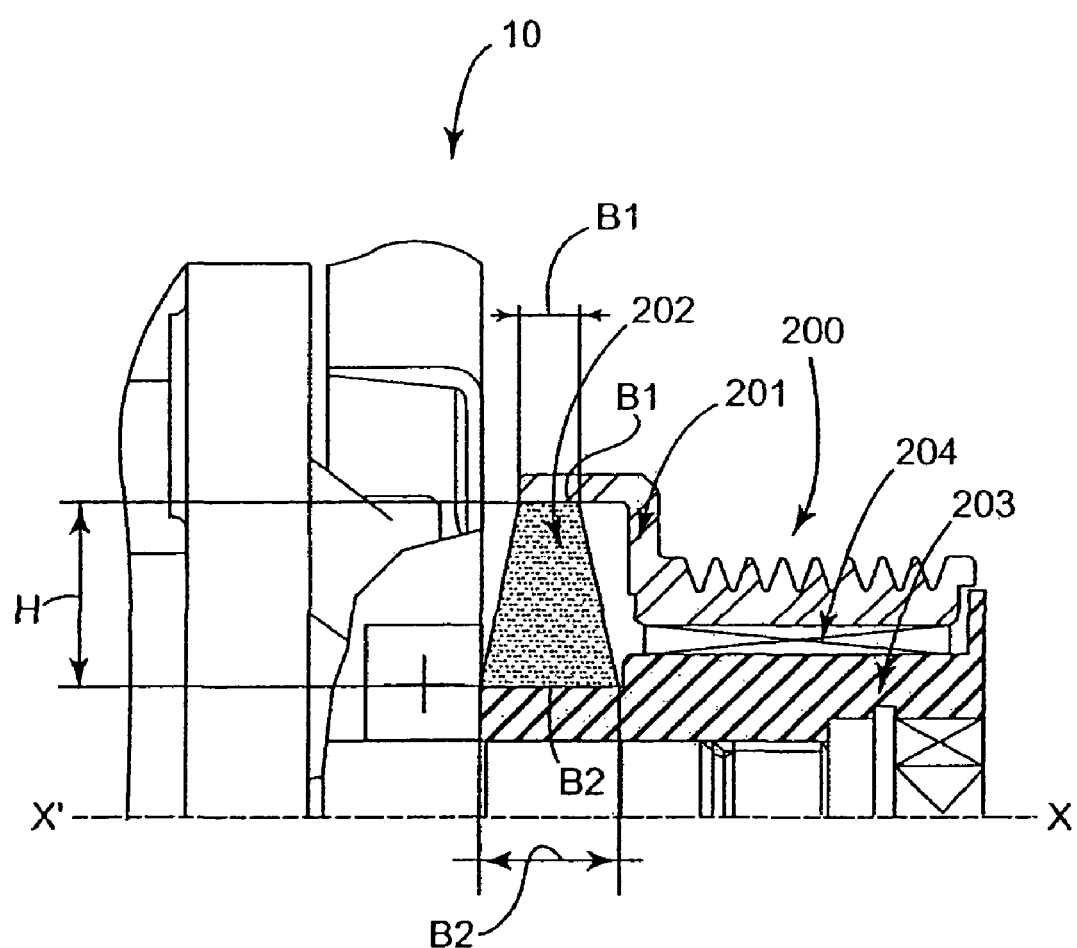
FIG. 2 is a fragmentary section view of a first example of a pulley of the invention having an annular element of elastic material for a separate reversible alternator of the invention.

FIG. 2 is a section view, simplified by omitting the symmetrical portion about the axis X'X, showing a first embodiment of a pulley 200 of the invention having an annular ring of rubber material for use with a separate reversible alternator 10. The pulley 200 has a peripheral rim 201, an annular decoupling ring 202, and an internal hub 203. The rim and the hub are made of metal and are mounted on a ball bearing 204.

The ring 202 is located between the hub 203 and the rim 201 on which a drive belt (not shown) is positioned. This decoupler is dimensioned in terms of material and section, in particular the sizes of the bases B1, B2 and of the height H of its trapezoidal type profile, to present stiffness of about 1 N.m/°, leading to angular deformations with a maximum of about 30°.

Under such conditions, the torque developed by the starter-alternator in drive mode, on starting, is at most about 30 N.m. This allows for proper starting (in terms of torque response time by force damping) when the application is not too severe, i.e. for the crankshaft presenting opposing torque of about 75 N.m to 90 N.m, e.g. for a reduction ratio of 3 between the pulley diameters of the crankshaft and of the alternator.

Decoupling while running remains effective since decoupling remains the basic function of such a ring, since its stiffness can remain sufficiently low.

Figure 3B:
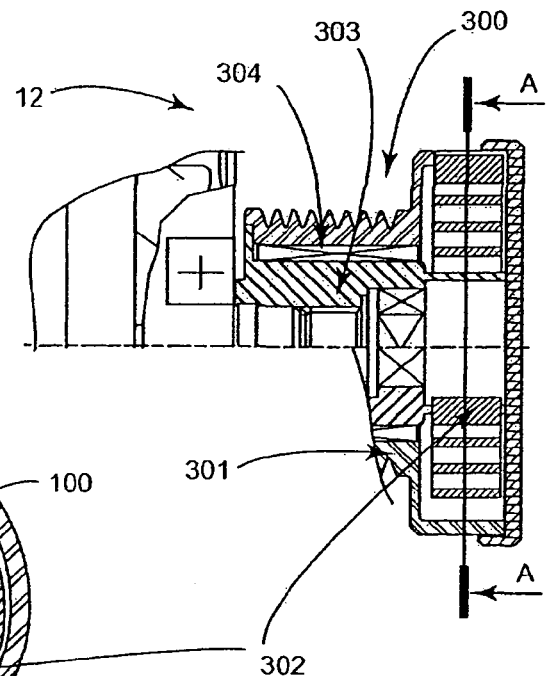
FIGS. 3a and 3b are longitudinal and cross-section views on A-A and B-B showing an example of a pulley of the invention for a reversible alternator and having a torsion spring.
Figure 3A:
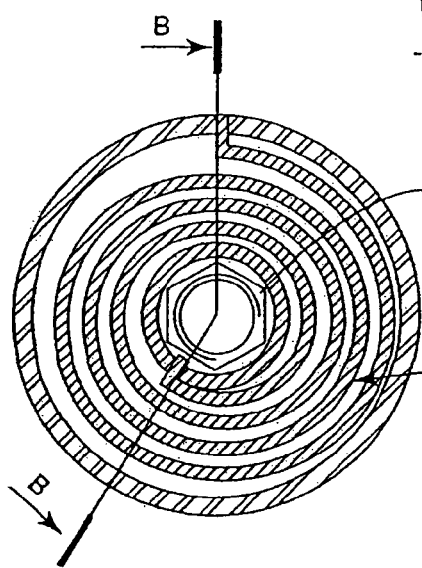

FIGS. 3a and 3b are a longitudinal section view on B-B (FIG. 3a) and a cross-section view on A-A (partially cut-away FIG. 3b) showing another example of a pulley 300 of the invention for a reversible alternator 12 and having a torsion spring 302. The spring is disposed between the rim 301 and the hub 303 around a central nut 100, the rim and the hub being mounted on a ball bearing 304.

Figure 4:
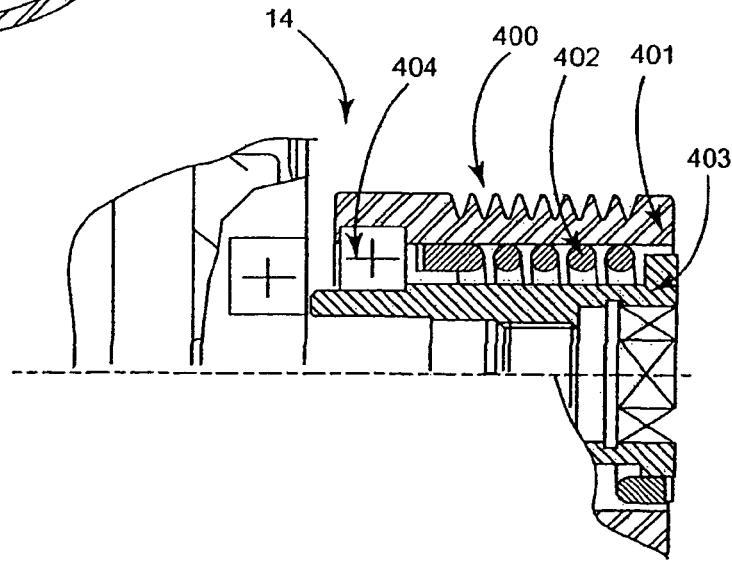
FIG. 4 is a partially cut-away section view of an example of a pulley of the invention for a reversible alternator and having a helical spring.

FIG. 4 is a simplified longitudinal section view showing another example of a pulley 400 for a reversible alternator 14, the pulley having a helical spring 402 disposed between a rim 401 and a hub 403 mounted on a bearing 404.

A variant pulley 500 of the invention is shown in longitudinal section and in an exploded perspective view in FIGS. 5a and 5b, which pulley is suitable for providing two different stiffness values for a reversible alternator 16. The pulley 500 has a rubber ring 502 as its basic resilient element disposed between the rim 501 and the hub 503 mounted on the central nut 100, the rim and the hub being separated by a smooth bearing 504.

The basic stiffness K1 provided by the rubber ring 502 is added to that provided by a deflection limiter 510 comprising a central plate 512 secured to an outer face of the central hub 503 and by resilient abutments 514 that are regularly disposed on an inside face of the rim 501. The abutments and the deflection limiter are shaped to come into deforming contact while starting. The deflection limiter then provides additional stiffness under starting conditions for alternator torque values that are significantly greater than +30 N.m, for example.

With reference to FIG. 5b, the plate 512 of rigid plastics material is substantially square in shape, presenting contact faces $F_c$, and the two rubber abutments 514 are substantially triangular in shape, presenting two main contact faces $F_p$.

Figure 6:
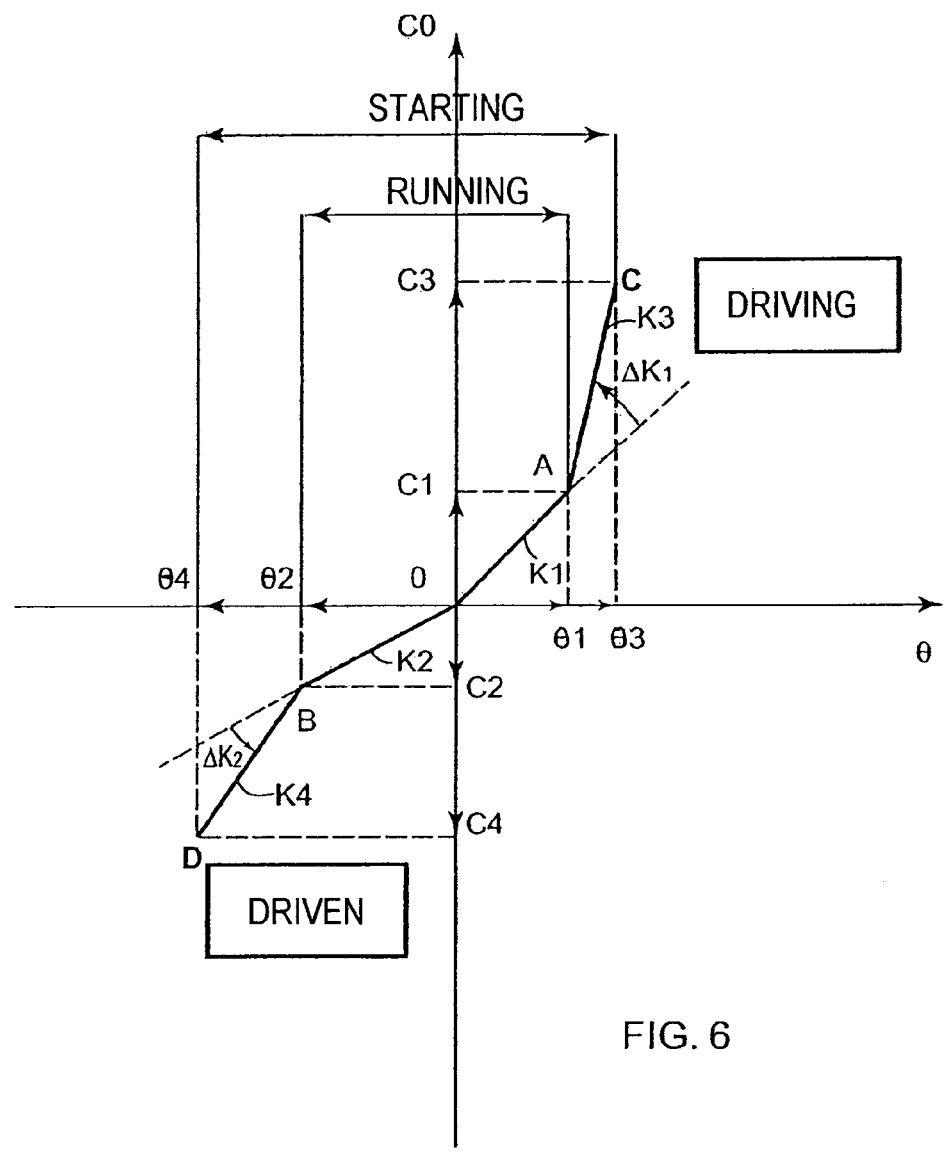
FIG. 6 is a diagram of torque as a function of angular deformation for a pulley of the invention for a reversible member in the most general circumstance in which each revolution condition (starting or running) in each mode (driving or driven) presents its own stiffness.

FIG. 6 is a plot of alternator torque Co as a function of angular deformation θ in a pulley of the invention for a reversible alternator and shows the various stiffnesses involved, for the most general circumstances.

Figure 16:
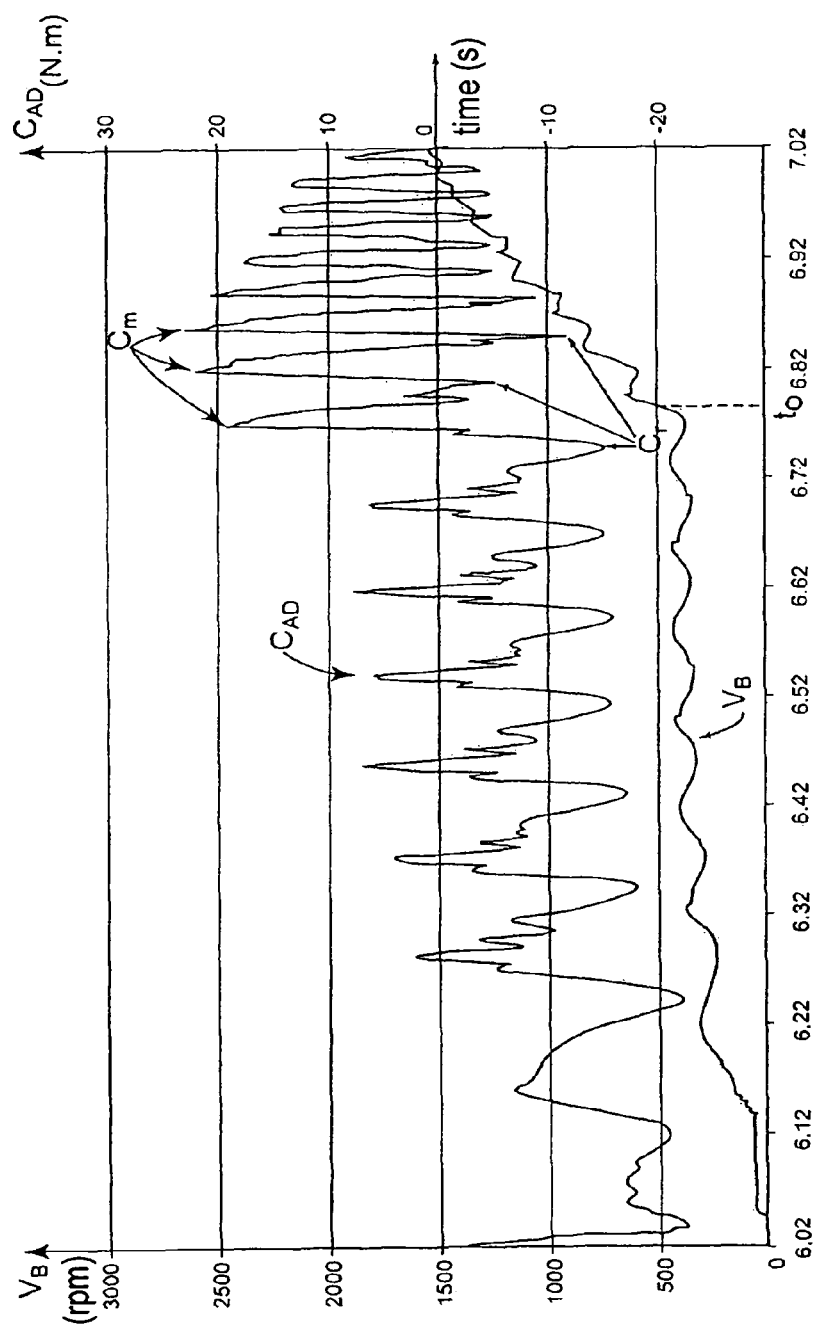
FIG. 16 (described above) plots timing diagrams for crankshaft speed VB and fluctuations of torque in the starter-alternator.

While starting, the alternator tends to deliver driving torque that goes from 0 to C3, e.g. up to 60 N.m, however it can also receive torque that goes form 0 to C4 because of the fluctuations described in the introduction (see FIG. 16). Angular deformation therefore sweeps over the entire range θ4 to θ3, alternating between drive mode (positive up to θ3) and driven mode (negative down to θ4).

Thereafter, under running conditions, sweeping is reduced to the basic range of deformation that extends between θ2 and θ1, alternating between driven torque levels (0 to θ2) and driving torque levels (0 to θ1), corresponding overall to the range C2-C1 (e.g. −20 N.m to +20 N.m).

In the basic deformation range, regardless whether operating under starting conditions or under running conditions, at least one basic decoupler element is involved, and depending on the driving or driven direction of the torque, the stiffnesses involved are K1 (linear portion O-A in the diagram) or K2 (linear portion O-B in the diagram), where K2 can be equal to K1 for a decoupler that is symmetrical.

Over larger ranges of deformations, θ1-θ3 and θ2-θ4, that are dedicated to starting conditions with driving and driven torques, the basic decoupler element of stiffness K1 or K2 as the case may be, is associated with a deflection limiter of stiffness ΔK1 or ΔK2 as the case may be, thereby applying a resulting stiffness respectively equal to K3 (portion A-C) or K4 (portion B-3), presenting greater absolute values (e.g. 2 N.m/° to 4 N.m/°).

Advantageously, the basic element is designed in terms of dimensions and material so as to provide a stiffness value K1 that is optimized for the pure decoupling stage.

For example, the pulley 500 shown in FIGS. 5a and 5b may present the same degree of decoupling (K1=K2) and the same degree of deflection limitation (implying K3=K4) both in drive mode and in driven mode.

FIGS. 7a to 7d show a variant pulley 700 presenting stiffnesses that differ in drive and driven modes under starting conditions.

Figure 7B:
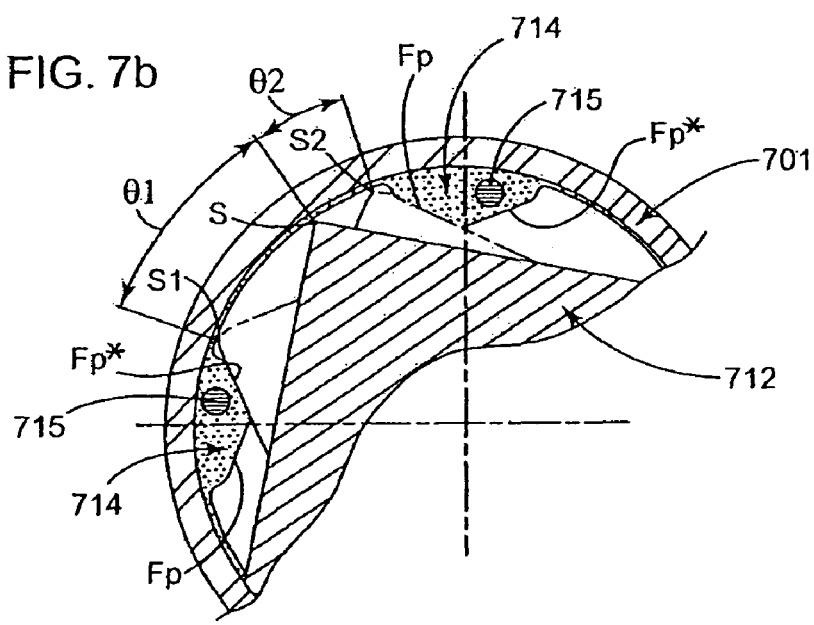
FIGS. 7a to 7d show a variant of the pulley of FIGS. 5a and 5b in a perspective view (FIG. 7a) and in fragmentary cross-sections with the central plate in different positions relative to the abutments (FIGS. 7b to 7d) for abutments made of a material having differing densities so as to enable stiffness to be shared under starting/running conditions in a manner that depends on the mode of operation, i.e. driving or driven.
Figure 7A:
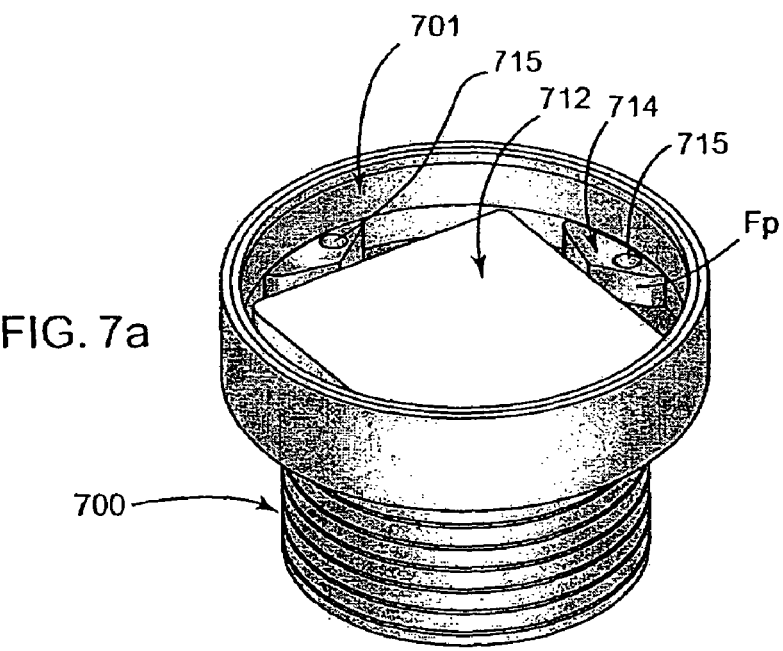

FIG. 7a is a perspective view in which the central plate 712 of rigid plastics material reproduces the plate shown in the preceding variant (FIGS. 5a-5b), associated with a resilient decoupling ring and a deflection limiter. The resilient abutments 714 of the limiter, formed on the inside face of the rim 701, likewise reproduce the configuration of the preceding version, but in this version they are reinforced by a rigid segment 715 of plastics material. These segments are secured in respective channels located close to one particular face Fp* of the main faces Fp of each abutment.

The section view of FIG. 7b shows the position of the plate 712 in the free state. A vertex S of the plate in this position forms respective deformation angles θ1 and θ2 with the same vertex S when moved to corresponding positions S1 and S2 of the plate 712 (dashed line) respectively in contact with the faces Fp of the adjacent abutments 714.

The angles θ1 and θ2 define the deformation of the resilient assembly of the pulley in the transitions between starting and running conditions respectively in drive mode (corresponding to the plate coming into contact with the face Fp* densified by the proximity of the rigid segment 715) and in driven mode (corresponding to contact between the plate and the non-reinforced face Fp).

In other words, the distribution of values for the angles θ1 and θ2 corresponds to the respective distributions of the stiffnesses K1 & K3 and of the stiffnesses K2 & K4 in each of the deformation ranges, respectively in drive mode and in driven mode.

The position of the plate in the free state is then readjusted so that the distribution of deformation values is optimized with respect to the dynamic characteristics of torque transmission and of system decoupling both for starting and for running conditions and for each of the modes of operation (driving and driven).

Figure 7C:
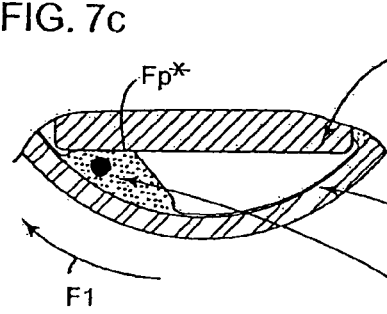
Figure 7D:
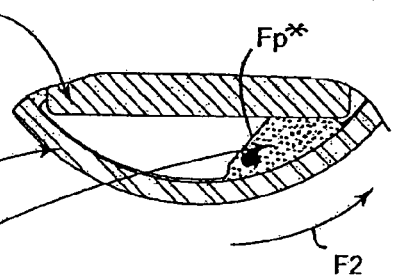

FIGS. 7c and 7d show more precisely the position of the contact made by the plate 712 under both starting and running conditions on passing (by turning in the directions of arrows F1 and F2) respectively into drive mode (FIG. 7c) (with the plate 712 coming into contact with the reinforced faces Fp* of the abutments 714), and in driven mode (FIG. 7d) (with the plate 712 coming into contact with the non-reinforced faces Fp of the abutments 714).

Figure 8B:
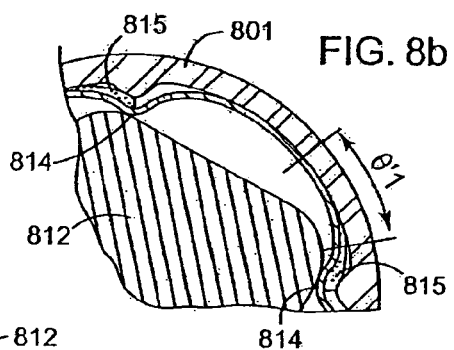
FIGS. 8a to 8c are fragmentary cross-section views for different relative positions of a deflection limiter including a central plate that is square in shape and resilient peripheral abutments made from a peripheral spring, some of the abutments being reinforced in stiffness so as to enable operation to be adapted to the two directions of applied torque.
Figure 8A:
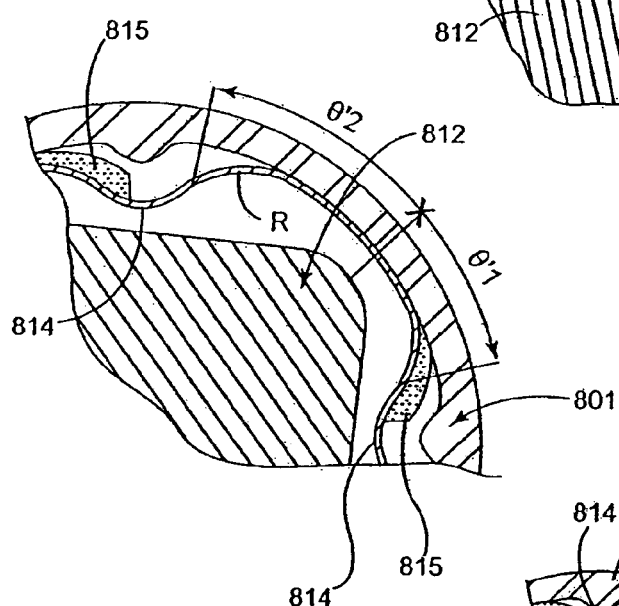
Figure 8C:
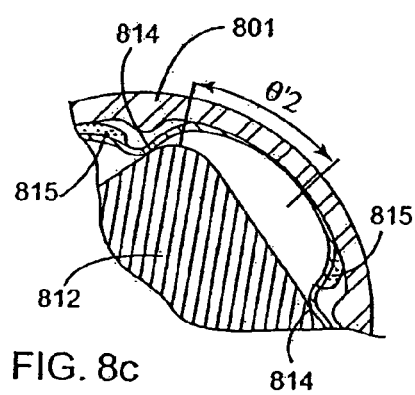

Another example of a deflection limiter having different stiffnesses for starting in drive and driven modes is shown in FIGS. 8a to 8c. This limiter differs from the preceding limiter by having resilient peripheral abutments formed by projections 814 of a peripheral annular spring blade R mounted against the rim 801. Each of these projections has a portion of stiffness that is reinforced by a resilient tongue 815 inserted between the spring R and the rim 801 so as to define stiffness that is greater in drive mode.

In addition, the angles θ'1 and θ'2 are preadjusted when the plate 812 is in the free position (FIG. 8a), as in the preceding version, so as to adapt the distribution of deformation as a function of starting or running conditions, with respect to the dynamic characteristics of torque transmission and system decoupling for each of those conditions and for each mode of operation: drive mode (FIG. 8b) in which the plate 812 is in deforming contact with the projecting portions 814 that are reinforced by the compressed tongues 815, and driven mode (FIG. 8c) in which the plate 812 is in contact with the non-reinforced projecting portions.

Figure 9A:
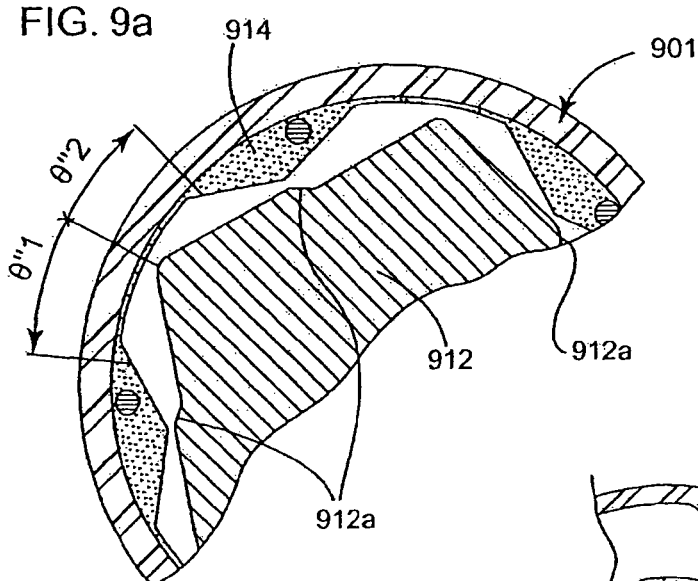
FIGS. 9a to 9e are fragmentary cross-section views showing three other variants of deflection limiters (one of which is shown by three relative positions for the plate and the abutments in FIGS. 9b to 9d), enabling stiffness to be adapted to the driving/driven modes of operation.

Other variants of the deflection limiter are shown in FIGS. 9a to 9e. With reference to FIG. 9a, the limiter comprises reinforced resilient abutments 914 on the rim 901 of the same type as the abutments shown in FIGS. 7a to 7d. However the plate 912 is of pentagonal shape with faces that include setbacks 912a. These setbacks induce deflections that are asymmetrical, respectively θ"1 and θ"2, corresponding to the drive and driven modes under starting conditions.

Figure 9C:
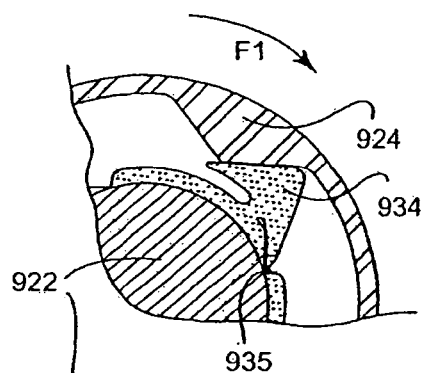
Figure 9B:
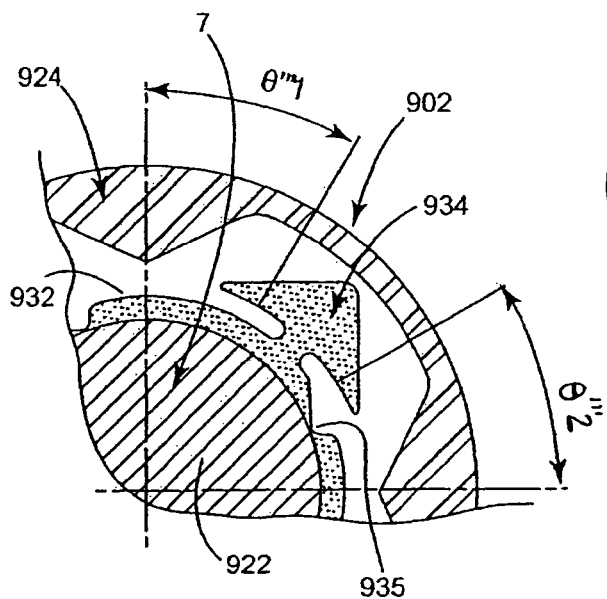
Figure 9D:
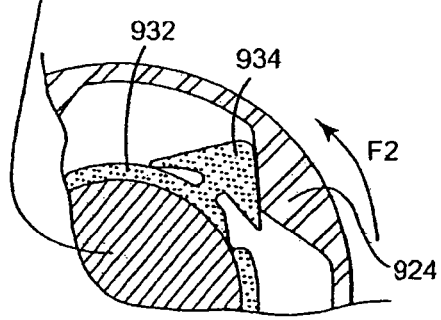

With reference to FIGS. 9b to 9d, the abutments 924 are integral portions of the rim 902 and are therefore rigid. The resilience of the contact between the abutments and the circular plate 922 is provided by a rubber coating 932 on the plate 922. This coating presents notches 935 and projections 934 of arrow-head shape. Preadjustment of the plate enables deflection angles θ'''1 and θ'''2 to be defined for the drive and driven modes.

In drive mode (turning in the direction of arrow F1 in FIG. 9c), each projection 934 penetrates into a notch 935 and contact is transmitted via the projection 934 between the rigid abutment 924 and the rigid plate 922. In driven mode (turning in the opposite direction as shown by arrow F2 in FIG. 9d), the projection 934 comes into deforming contact firstly against the abutment 924 and secondly against the coating 932, which presents thickness that is significantly greater than the thickness left by the hollow of the notch 935. Under such conditions, the stiffnesses in driven mode and in drive mode are significantly different.

Figure 9E:
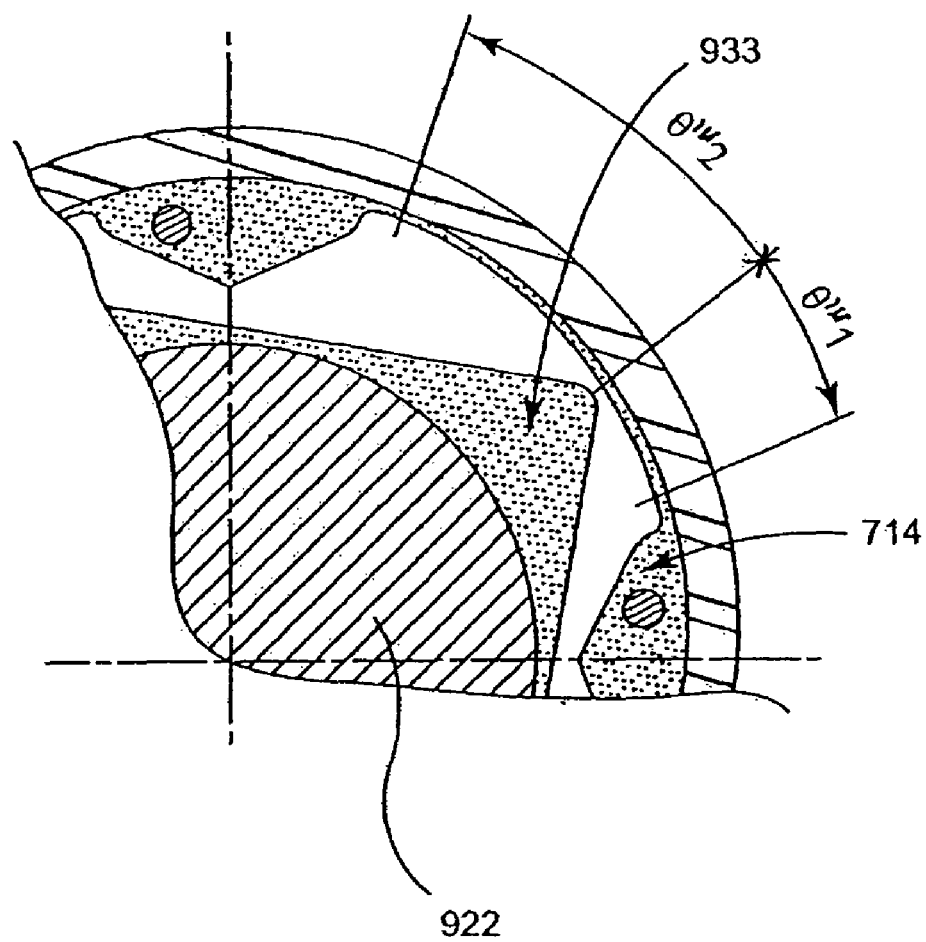

The variant shown in FIG. 9e uses resilient abutments reinforced by a segment 714 as in the example shown in FIGS. 7a to 7d that are mounted on the rim 901. The abutments are associated with the circular plate 922 that is coated with a rubber sleeve 933 presenting a shape that is geometrically square. The deflection angles remain adjusted on $\theta^{iv}1$ and $\theta^{iv}2$.

Various locations for the basic resilient elements and for the deflection limiter, as constituted by any of the preceding examples are shown in FIGS. 10a to 10d in longitudinal section views of various pulleys, given references 600a to 600d, and mounted on the reversible alternator 10. The resilient assemblies are mounted between a rim 601a to 601d and a hub 603a to 603d, the hub and the rim being assembled together via a bearing 604, and more generally by any known load-supporting device. The deflection limiter is formed by a plate 612 and by abutments 614, and the basic resilient element is formed by a ring of rubber 602.

Figure 10A:
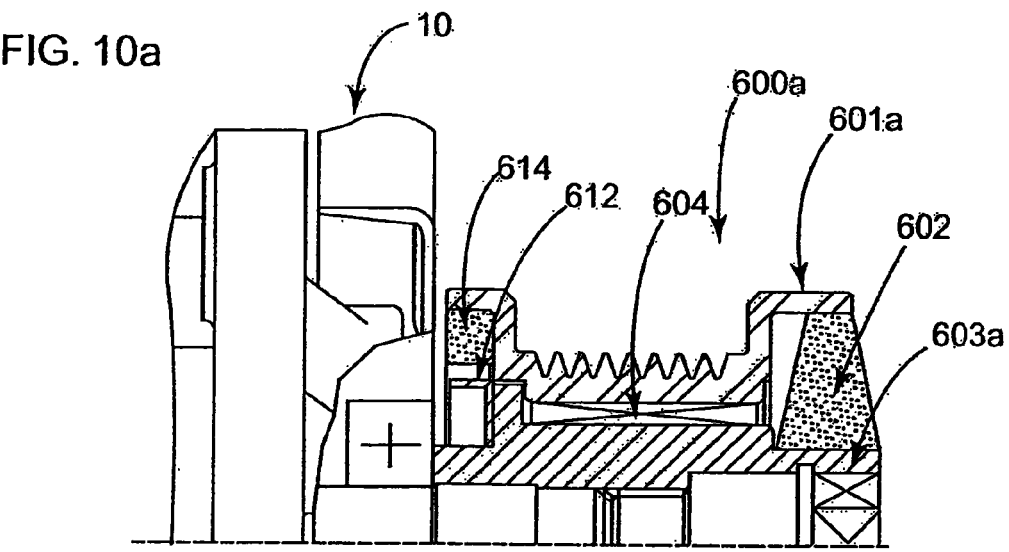
FIGS. 10a to 10d are longitudinal section views of pulleys of the invention having different locations for the basic resilient element and the deflection limiter.
Figure 10B:
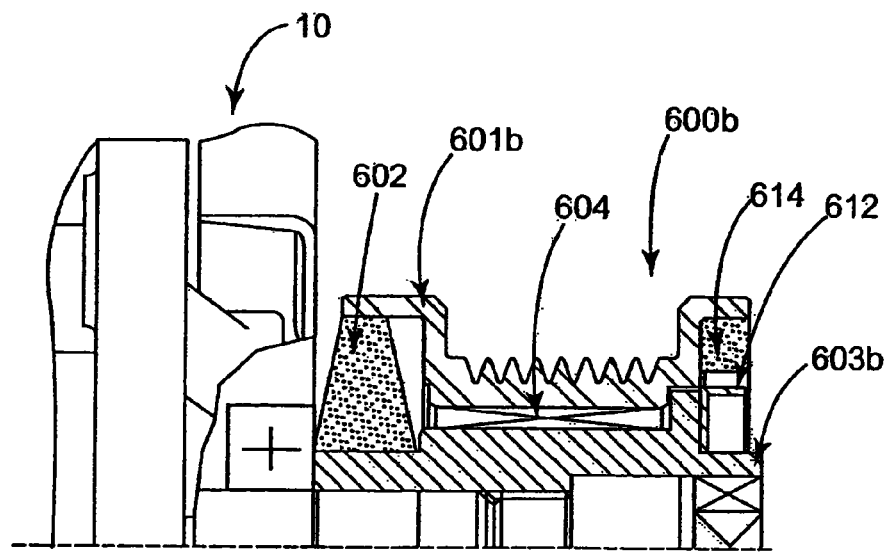

In FIGS. 10a and 10b, the deflection limiter 612-614 and the resilient ring 602 are disposed at the ends of the pulley, respectively 600a or 600b.

Figure 10C:
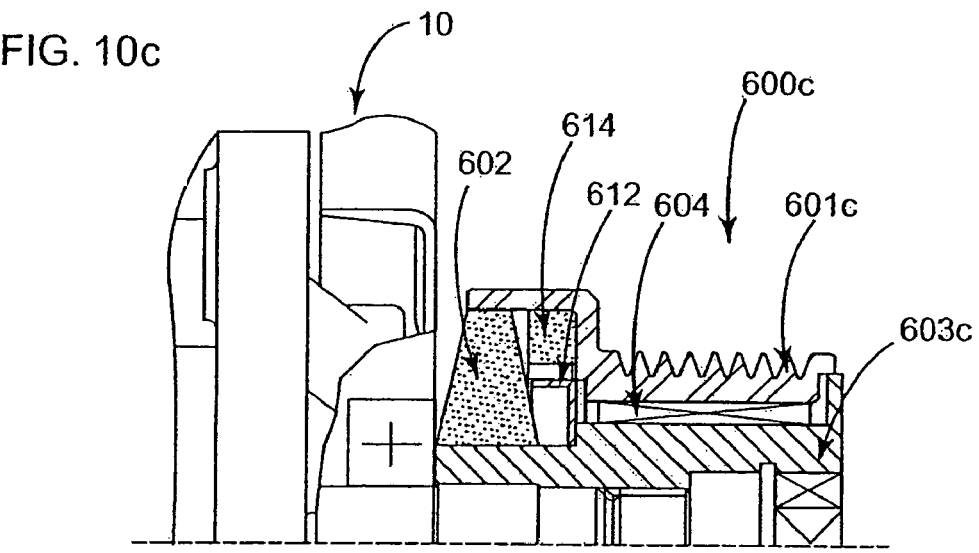
Figure 10D:
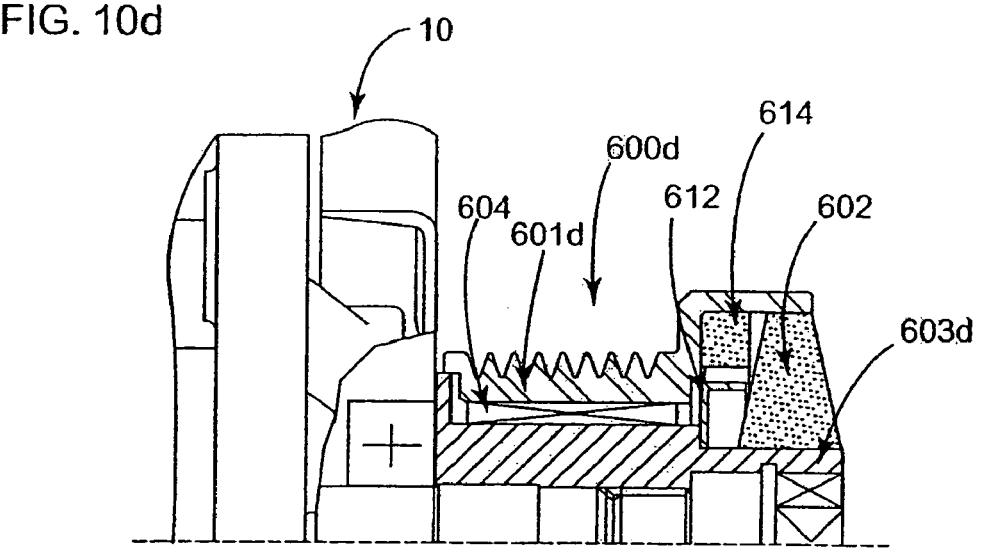

In FIGS. 10c and 10d, the limiter 612-614 and the ring 602 are disposed side by side at the end of the pulley (respectively adjacent to the alternator 10 and at the end remote from the alternator 10).

A variant pulley 600 for a reversible alternator 10 is shown in the section view of FIG. 11. It comprises a rim 601 and a hub 603 assembled to the load-support device 604. The pulley has two basic resilient rings 602a and 602b, each associated with a respective deflection limiter 612a-614a and 612b-614b.

Each associated ring and limiter is mounted on a respective freewheel 3a or 3b. The freewheels are mounted in opposition. Thus, only one freewheel is declutched in either direction and the corresponding ring and limiter pair is then inactive. However the other freewheel is then blocked and engages the ring and limiter pair that it is carrying. Thus:

while driving, the freewheel 3a is blocked and the resilient assembly 602a-612a-614a is engaged, with the stiffness K1 of the ring 602a while running and with the total stiffness K3 of the resilient assembly while starting (with reference to FIG. 6); and while being driven, the freewheel 3b is blocked and the resilient assembly 602b-612b-614b is engaged with the stiffness K2 of the ring 602b while running and the stiffness K4 of the assembly while starting (with reference to FIG. 6).

Figure 12A:
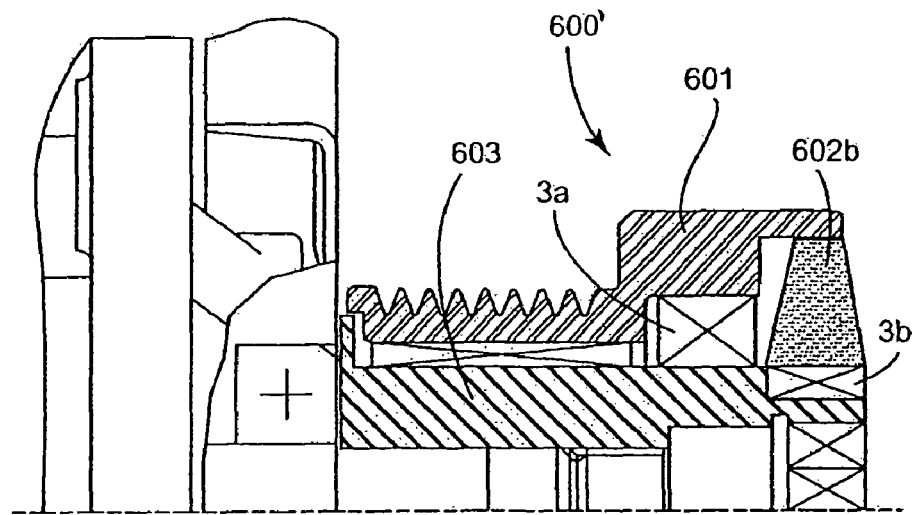
FIGS. 12a and 12b show variants of the preceding pulley without the deflection limiter.

In a variant pulley 600' shown in FIG. 12a, so long as crankshaft torque remains limited while starting and does not exceed 90 N.m, for example, the freewheel 3b supports only the resilient ring 602b without the deflection limiter 612b-614b. The other freewheel 3a connects the rim 601 directly to the hub 603 without a deflection limiter or a ring.

Figure 12B:
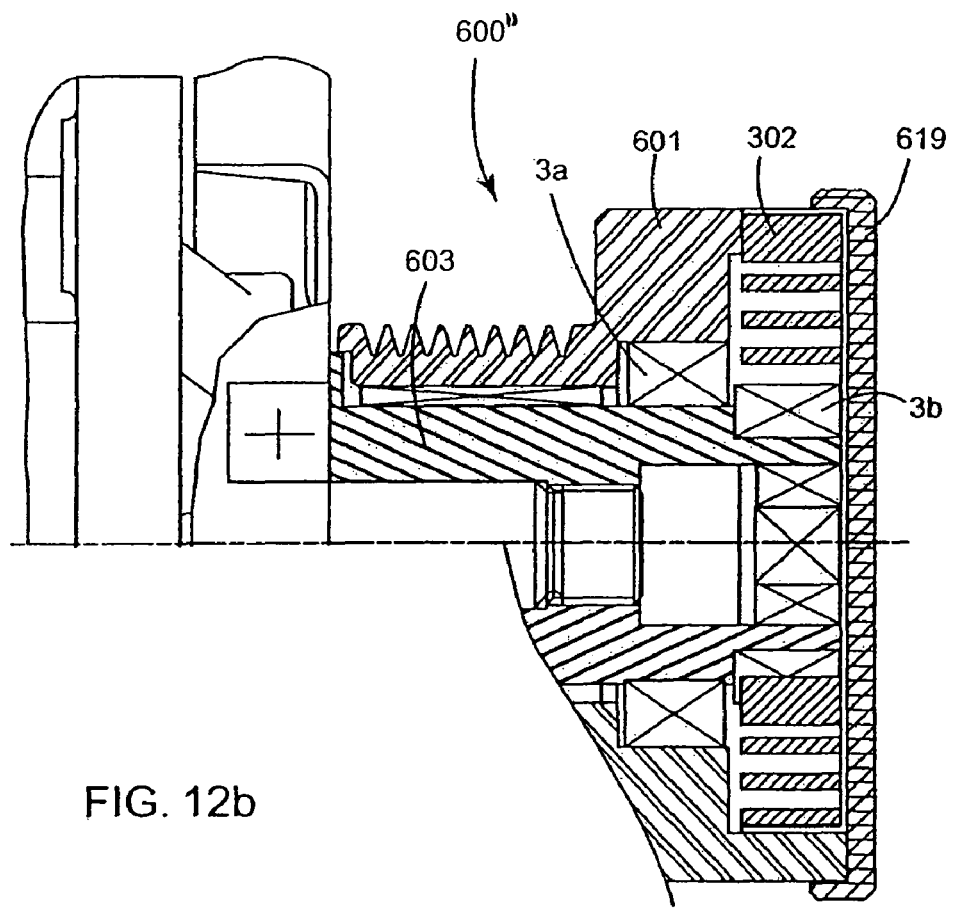

In FIG. 12b, a variant 600" of the preceding pulley presents a torsion spring 302 that is protected by a cheek plate 619 taking the place of the resilient ring 602b.

In these two variants, the freewheels continue to be mounted in opposition and the resilient element 302 or 602b act depending on the direction of the torque opposing one or the other freewheels.

Figure 13A:
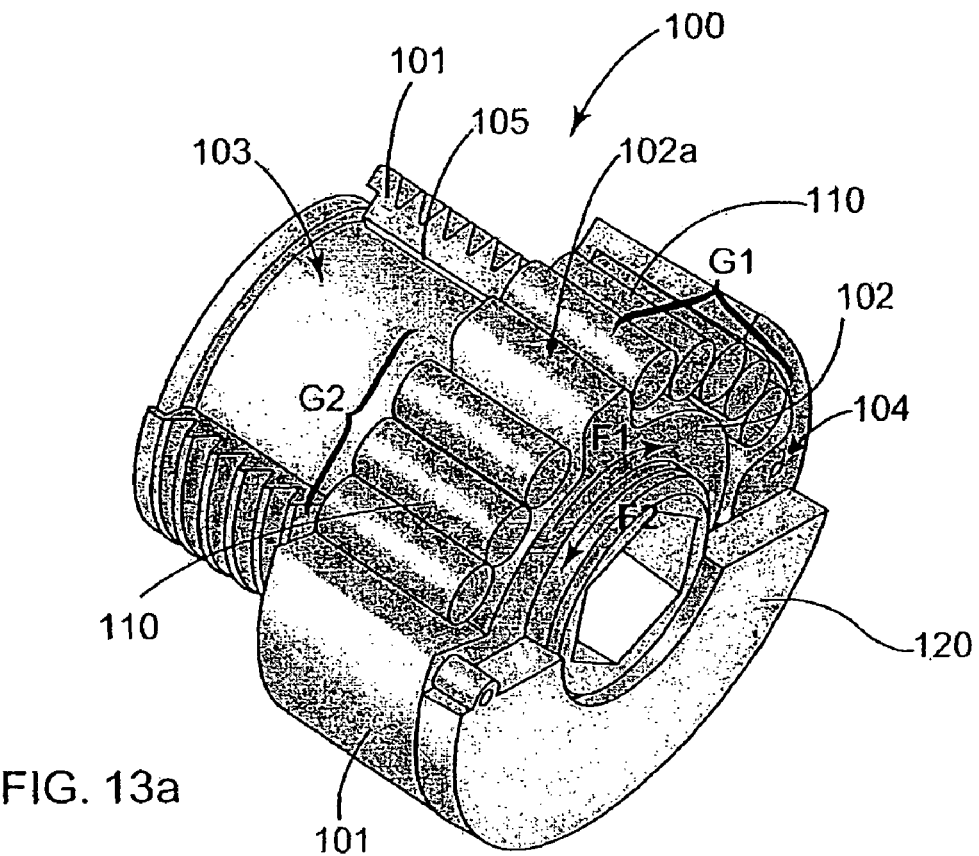
FIGS. 13a and 13b are a partially cut-away perspective view and a longitudinal section view of a pulley having resilient rollers inserted between the central plate and the abutments of a deflection limiter.
Figure 13B:
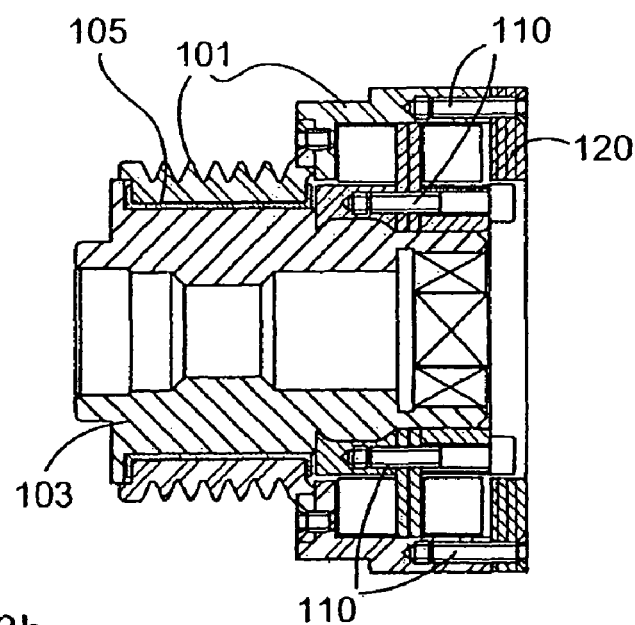

In another variant pulley 100, shown in FIGS. 13a and 13b, use is made of resilient rollers 110 inserted between projections 102a from a cylindrical central plate 102 secured to the hub 103, an abutment 104 formed on the rim 101 of the pulley. The deflection limiter is constituted by the assembly 102-110-104 and the rim 101 is assembled to the hub 103 via a smooth bearing 105. An outer plate 120 is secured to the rim 101 and protects the deflection limiter.

The rollers are made of rubber or elastomer material of appropriate elasticity, and they are present as a determined number in groups and peripheral levels so as to define stiffness that is appropriate for starting or for running and for each drive or driven mode of operation. In this example, the rollers 110 are made of EPDM, presenting a coefficient of friction lying in the range 0.3 to 0.6. With reference to FIG. 13b, the rollers are distributed in two peripheral levels working in parallel, while the rollers are disposed on a single peripheral level in groups G1 and G2 of five and three rollers in the example of FIG. 13a.

Depending on the mode of operation which determines a deformation direction and on the starting/running conditions which determine the forces or vibrations, the compression of the rollers differs between the abutments 104 and the projections 102a, leading to stiffness values that are likewise different. In the example, the groups G1 provide the stiffnesses K1 and K3 (cf. FIG. 6) in drive mode (drive torque along arrow F1), while the groups G2 provide the stiffnesses K2 and K4 (cf. FIG. 6) in driven mode (resisting torque along arrow F2).

The variable characteristics of the materials and the dimensions used for the rollers make it possible to obtain a wide variety of stiffness values. FIG. 14 plots measurements of torque as a function of angular deformation that are very different in drive mode for two pulleys $P_A$ and $P_B$ of the roller type that comprise respectively a group of three rollers of material having Shore A hardness of 70, and five rollers of material having Shore A hardness of 60: for drive torques over the same range of 0 to 35 N.m, the diagram for pulley $P_A$ (curve $P_A$) presents a relatively narrow range of deformation from 0 to about 20°, whereas the diagram for pulley $P_B$ (curve $P_B$) presents a considerably greater range of deformation, of 0 to 65° in the example shown. The transition angles between starting and running, respectively $\theta_A$ and $\theta_B$ lie in respective progressive transition zones $Z_A$ and $Z_B$ between zones that are more linear. Respective linear regression lines $D1_A$, $D2_{A1}$ $D1_B$, and $D2_B$ determine the stiffness values and the positions of the transition angles.

FIG. 15 is a diagram showing measured torque as a function of angular deformation, $Co/\theta$, for a pulley of the same type as above, in drive and driven modes, and having two groups (cf. FIG. 13a): a group G1 comprising three rollers with Shore A hardness of 70, and a group G2 of five rollers with Shore A hardness of 60. This diagram shows that it is possible to obtain transition zones Z1 and Z2 between starting and running conditions for both modes. The linear regression lines D1, D2, D3, and D4 serve to deduce the respective stiffness values K1 & K3 and K2 & K4, and the positions of the transition angles $\theta_m$ and $\theta_r$ between the running and starting conditions for each of the drive and driven modes. The roller system in the corresponding pulley provides a long range of liner deformation in driven mode under running conditions.

What is claimed is:

1. A pulley for a member for transmitting power by means of a belt at a starting speed and then at a started speed, the torque of said member being a function of angular deformation in said pulley, the pulley including at least one resilient decoupler element operating between a central hub and a rim over which the drive belt is tensioned, wherein the resilient decoupler element is associated with a progressive deflection limiter element to form a resilient decoupling assembly that provides two stiffness values in each of a drive phase and a driven phase of the said member for transmitting power between said central hub and said rim, a first basic stiffness value being provided by the resilient decoupler element that is active at starting speed or at started speed as a result of the rotational deflection angle between said rim and said hub being less than a pre-determined deflection angle, and an additional stiffness value being provided by the progressive deflection limiter as a result of said rotational deflection angle being above said pre-determined rotational deflection angle, the resilient decoupling assembly thus providing a stiffness value greater than said first basic stiffness value.

2. A transmission pulley according to claim 1, in which the decoupler element is an elastomer ring bonded directly or via an insert, a torsion spring or a helical spring, or at least one of said elements associated with two freewheels mounted in opposition.

3. A transmission pulley according to claim 2, in which the elastic material of the ring is a material of the rubber type selected from silicone, an HNBR, chloroprene, an EPDM, a BR, an NR, and a combination of at least two of these compounds.

4. A transmission pulley according to claim 1, in which the deflection limiter comprises two components: a central plate secured to an outside face of the central hub, coupled to abutments regularly disposed at the periphery of an inside face of the rim, the abutments and the plate being shaped to come into deforming contact.

5. A transmission pulley according to claim 4, in which the central plate is in the form of a regular polygon, and the angular abutments are of elastic material, each presenting two main contact faces.

6. A transmission pulley according to claim 4, in which the central plate is annular and presents a peripheral layer of elastic material forming projections coming into contact with the peripheral abutments.

7. A transmission pulley according to claim 4, in which the abutments are formed from a peripheral spring blade mounted on the rim and presenting inwardly-directed projections that are regularly distributed.

8. A transmission pulley according to claim 4, in which the defections limiters are made asymmetrical by the presence of angular abutments and/or projections from the angular plate that present differences in density, modulus, or shape between contact faces, such that the deforming contact obtained via different faces define stiffnesses that are adapted to the direction of the corresponding torque, by making use of an appropriate combination of two specific stiffnesses for each torque direction, obtained by associating:

the basic specific resilient element in a central range of positive and negative deformations respectively for each torque direction while starting or while running, and over ranges situated beyond the central range while starting; and the asymmetrical deflection limiter in each of said positive and negative deformation ranges for each torque direction, respectively.

9. A transmission pulley according to claim 8, in which a resilient decoupling assembly with optimized distribution of stiffness states corresponding to starting conditions and to running conditions in each torque direction is obtained by adjusting the position in the rest state of the projections from the plate which, together with each contact abutment corresponding to the drive or driven mode of said projections, form a preadjusted angle constituting the threshold for changing over between starting conditions and running conditions.

10. A transmission pulley according to claim 8, in which each abutment is constituted by two half-abutments of materials having different densities.

11. A transmission pulley according to claim 8, in which each abutment possesses a segment of material that is rigid or of greater density than the elastic material constituting the remainder of the abutment, the segment being disposed closer to one of the contact faces than to the other.

12. A transmission pulley according to claim 8, in which a tongue of elastic material is inserted between the rim and a portion of an abutment in the form of a projection from an annular spring blade.

13. A transmission pulley according to claim 1, in which, in order to distinguish likewise between the running stiffnesses in drive mode and in driven mode, decoupling is achieved by two basic resilient decoupler elements of different stiffnesses, at least one of these elements being associated with a deflection limiter of adapted stiffness depending on the mode, and each association is mounted on a freewheel, the two freewheels being in opposition so as to define a stiffness value that is adapted to each direction.

14. A transmission pulley according to claim 4, in which decoupling is provided by rollers disposed in spaces that are formed in the free state between the central plate and rigid abutments in at least two radial sets, preferably integrated in one or two levels, and of material of appropriate elasticity, friction coefficient, modulus of elasticity, and/or determined number, serving to define stiffness that is adapted to starting conditions and to running conditions in each direction of operation, driving or driven.

15. A power transmission pulley in which a resilient decoupling assembly is located between the rim and the hub, wherein effective decoupling under running conditions and sufficient drive torque with damping adapted to starting conditions are provided when the resilient assembly includes at least one deflection limiter element according to claim 1 associated with a declutched limiter.

16. A pulley for transmitting power to a reversible member in which a resilient decoupling assembly is located between the rim and the hub, wherein effective decoupling under running conditions and sufficient drive torque with suitable damping under starting conditions are provided when the resilient assembly includes at least one resilient decoupling element according to claim 1, associated with a declutched limiter.

17. A power transmission pulley according to claim 16, in which the resilient assembly includes a resilient element mounted on a first free-wheel associated with a second freewheel mounted between the rim and the hub in opposition to the first freewheel.

18. A starter-alternator separate from the crankshaft of an engine and fitted with a pulley according to claim 1.

19. A drive system for a motor vehicle engine, the system including in particular an alternator and a crankshaft, at least one of which is fitted with a transmission pulley according to claim 1, and connected by a belt.

* * * * *